United States Patent

Kelm-Kläger

[11] Patent Number: 6,101,875
[45] Date of Patent: Aug. 15, 2000

[54] METHOD AND APPARATUS FOR BALANCING AUTOMOBILE WHEELS

[75] Inventor: Ronald Kelm-Kläger, München, Germany

[73] Assignee: Beissbarth GmbH, Munich, Germany

[21] Appl. No.: 08/899,301

[22] Filed: Jul. 23, 1997

[30] Foreign Application Priority Data

Sep. 9, 1996 [DE] Germany ............................ 196 36 542

[51] Int. Cl.[7] ................................................ G01M 1/32
[52] U.S. Cl. ............................................... 73/462; 73/487
[58] Field of Search ..................... 73/462, 487, 66, 73/468, 460

[56] References Cited

U.S. PATENT DOCUMENTS

| | | | |
|---|---|---|---|
| 4,011,762 | 3/1977 | Kubik | 73/486 |
| 4,576,044 | 3/1986 | Boni | 73/462 |
| 5,526,686 | 6/1996 | Fuchs et al. | 73/462 |
| 5,587,528 | 12/1996 | Rothamel et al. | 72/462 |

*Primary Examiner*—Hezron Williams
*Assistant Examiner*—Helen C. Kwok
*Attorney, Agent, or Firm*—Evenson, McKeown, Edwards & Lenahan, P.L.L.C.

[57] ABSTRACT

In a balancing apparatus, for determining the compensation position and the magnitude of a compensation weight to be attached to the automotive wheel on the basis of the measuring values obtained during the balancing process, the respective radius and the respective compensation plane for the compensation position at the automotive wheel are sensed via a sensor arm, an electronic device determines the magnitude of the compensation weight to be attached to the automotive wheel. The sensor arm is supported extendably and pivotally. Two string assemblies are attached to the sensor arm. The strings of the sensor arm are mechanically lockable at one or the other compensation position, respectively. One of the string assemblies on the sensor arm comprises an extendable spring and a stop which runs through a locking block attached to the housing of the balancing apparatus and and also comprises, at the other end an extendable spring. The other string assembly comprises a string attached to the housing of the sensor arm which ends at an endless string loop assembly. One run of the string assembly runs through a locking block attached to the housing of the balancing apparatus and the other run of the string of the string assembly comprises a stop which is lockable via the locking device. The compensation position or the compensation positions are thus stored in a mechanical manner, and the sensor arm is only extendable up to the respective position.

13 Claims, 3 Drawing Sheets

METHOD AND APPARATUS FOR BALANCING AUTOMOBILE WHEELS

BACKGROUND OF THE INVENTION

1. Field of the Invention

The invention pertains to a method and an apparatus for compensating the unbalance of an automotive wheel mounted on a balancing apparatus by using a balancing weight, wherein, for determining the compensation position and the magnitude of the balancing weight to be attached to the automotive wheel on the basis of the measurement values obtained during the unbalance measuring procedure, the respective radius and the respective compensation plane for the compensation position at the automotive wheel is sensed by a sensing device, the magnitude of the balance weight to be attached to the automotive wheel is determined and the balancing weight is attached to the predetermined compensation position.

2. Description of Prior Art

Such an apparatus is known, for example, from the German Patent 42 29 865. In this balancing machine, the compensation positions are stored electronically, and, for finding the stored compensation plane in which the compensation position is located which is determined by an electronic balancing unit, a signal is generated by the electronic balancing unit when the stored compensation plane is sensed by the sensor means after the compensation position and the magnitude of the balancing weight to be attached to the automotive wheel has been determined. If the wheel is dynamically balanced, there will be an inner compensation plane and an outer compensation plane involved as is well known in the art. The inner compensation plane is located to the side of the automobile when the wheel is mounted on the vehicle, and an outer compensation plane is located further out from the inner compensation plane. Thereby, it is not insured that the sensor actually remains in the position which he had when the signal was sounded.

SUMMARY OF THE INVENTION

It is an object of the invention to insure that the balancing weights are attached at the correct positions at the automotive wheel.

For achieving this object, the method of the invention is characterized in that the compensation position or the compensation positions are stored in a mechanical way whereby a mechanical locking means has the effect that a sensor arm provided in the sensing means can be extended only to the respective compensation position.

Furthermore, the object of the invention is achieved by an apparatus for compensation the unbalance of an automotive wheel mounted on a wheel balancing apparatus wherein the compensation position or the compensation positions are stored in a mechanical way or in a mechanical locking means which has the effect that a sensor arm which is extendably and pivotally provided in a sensing means and is extendable only to the respective compensation position, and wherein two string assemblies are attached to the sensor arm the strings of which string assemblies are mechanically lockable at one or another compensation position, respectively.

According to an advantageous embodiment of the apparatus of the invention, one of the string assemblies connected to the sensor arm comprises an extendable spring means and a stop, wherein the string extends through a locking block fixed to the housing of the balancing apparatus and comprises another extendable spring also at its other end.

According to an advantageous embodiment of the apparatus of the invention, the other string assembly comprises a string fixed to the sensor arm which string ends at an endless string loop assembly wherein one run of the string of the string loop assembly extends to a locking block attached to the housing of the balancing apparatus, and the other run of the string of the string loop assembly comprises a stop which is lockable by means of the arresting assembly.

According to advantageous embodiments of the inventive device, the locking blocks attached to the housing of the balancing apparatus are actuated mechanically or electro-mechanically when the sensor arm is in the respective compensation position.

According to an advantageous embodiment of the apparatus of the invention a potentiometer is arranged at one of the string hoists in order to measure the longitudinal displacement of the sensor arm from its compensation position.

Finally, the strings of the string assembly are toothed belts according to a further advantageous embodiment of the apparatus of the invention.

DESCRIPTION OF THE PREFERRED EMBODIMENT

Figure 1:
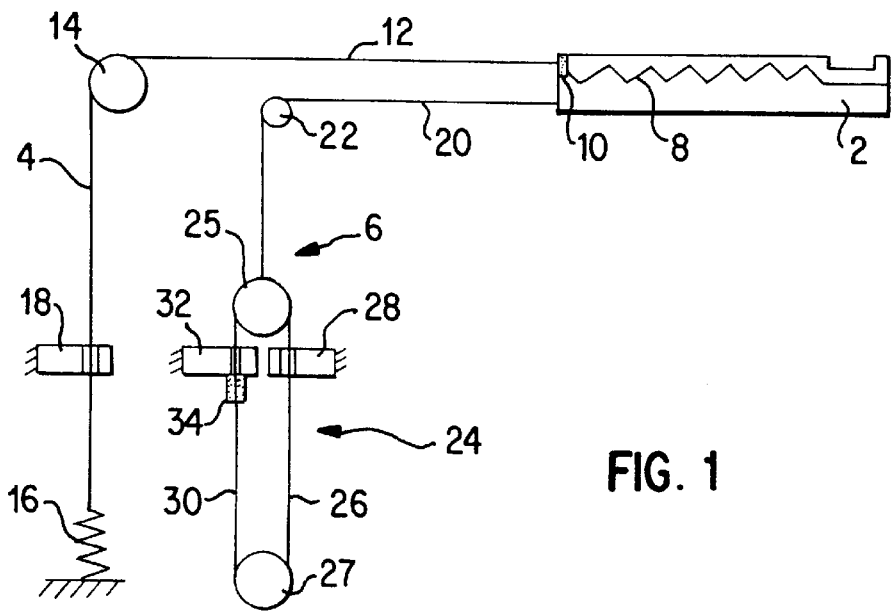
FIGS. 1 to 6 are diagramatic representations of different positions of the string assemblies which are attached to a sensor arm.

A sensor arm 2 is shown schematically in FIG. 1, a first string assembly 4 and a second string assembly 6 being attached to the sensor arm 2. The first string assembly 4 comprises a spring 8 arranged in the sensor arm 2, and a stop 10, a toothed belt 12 running around a roller 14 and an extendable spring 16 which is attached to the housing of the balancing apparatus. A locking block 18 is positioned between the roller 14 and the extendable spring 16 which locking block 18 is also attached to the housing of the balancing apparatus. The locking block 18 is actuated or closed respectively by means of an electromagnet as soon as the sensor arm 2 is at rest longer, than for example, two seconds while sensing the compensation position. The locking block 18 can also be closed in a mechanical way, for example, by means of string assemblies.

The second string assembly 6 comprises a toothed belt 20 which is attached, at its one end, to the sensor arm 2, runs across a roller 22 and ends, at its other end, at an endless string loop assembly 24 which extends across two rollers 25,27. A locking block 28 is arranged at one run 26 of the endless string loop assembly 24 which locking block 28 is connected to the housing of the balancing apparatus. An arresting assembly 32 is provided at the other run 30 of the endless string loop assembly 24 which arresting assembly 32 cooperates with a stop 34 connected to the string, as will be described later.

The various movements carried out by the apparatus of the invention in connection with the balancing process are described next.

FIG. 1 shows the rest position of the apparatus wherein the arresting assembly 32 is closed so that the stop 34 may not pass through the arresting assembly 32. The locking blocks 18 and 28 are in the opened position.

Figure 2:
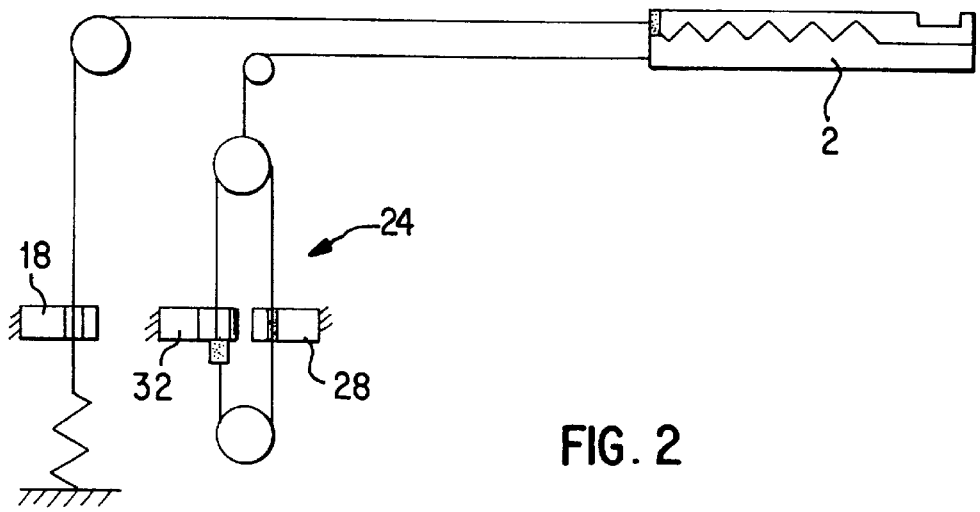

If the sensor arm 2 is to be moved to the inner compensation plane, the arresting assembly 32 remains closed such that the stop 34 can not pass through the arresting assembly 32. When the sensor arm 2 has arrived at the inner compensation plane the locking block 28 is locked, the arresting assembly 32 is opened so that the stop 34 may pass therethrough. The locking block 18 is open. The last mentioned operating position is shown in FIG. 2.

Figure 3:
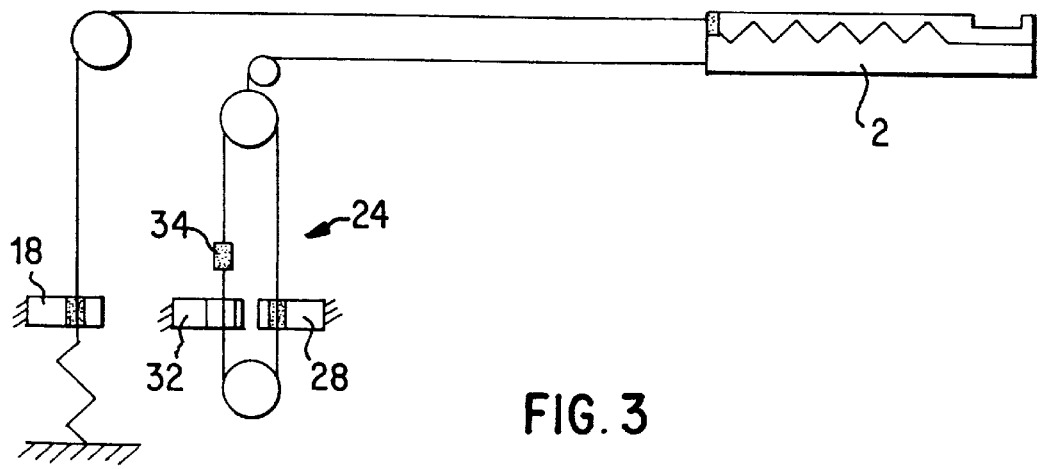

FIG. 3 shows the operating position in which the sensor arm 2 is to be moved to the outer compensation position. At this point, the locking block 28 is closed further on, the arresting assembly 32 is opened, and the locking block 18 is closed. The outer compensation position is mechanically locked thereby.

Figure 4:
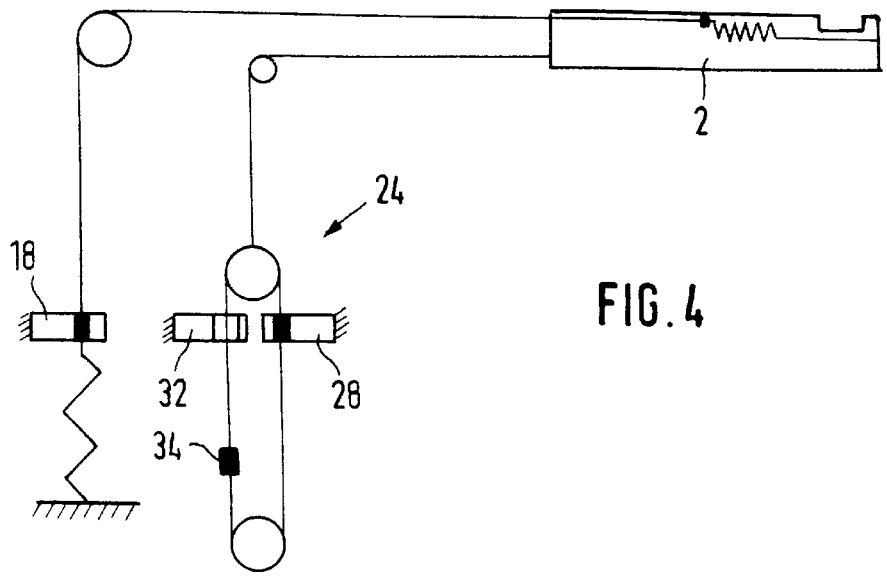

FIG. 4 shows the operating position in which the wheel is rotated in the balancing process and the sensor arm 2 is in its retracted position.

Figure 5:
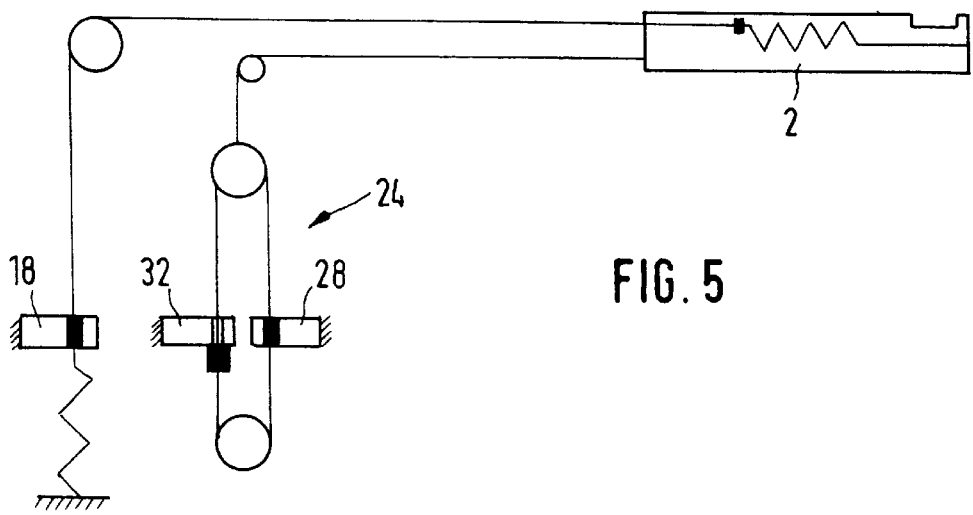

FIG. 5 shows the operating position in which the sensor arm 2 is moved to the compensation position at the inner compensation plane wherein the arresting assembly 32 as well as the locking blocks 18 and 28 are closed.

Figure 6:
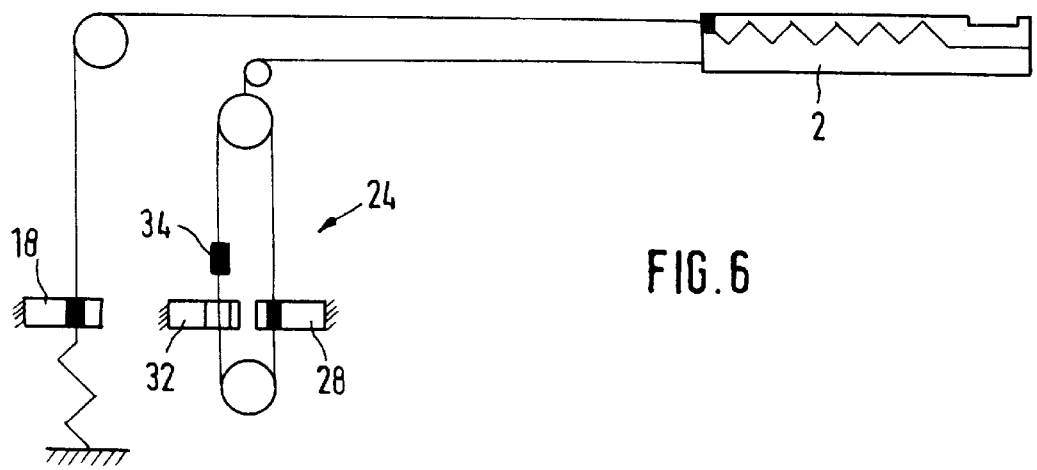

FIG. 6 shows the operating position of the sensor arm 2 in the compensation position at the outer compensation plane wherein the arresting assembly 32 is open and the locking blocks 18 and 28 are closed. The sensor arm 2 has reached the sensor position in the outer compensation plane when the stop 10 at the left hand end (direction of view as in FIGS. 1 to 6) of the sensor arm 2 comes into abutment or the tension spring 8 is fully extended respectively.

Figure 7:
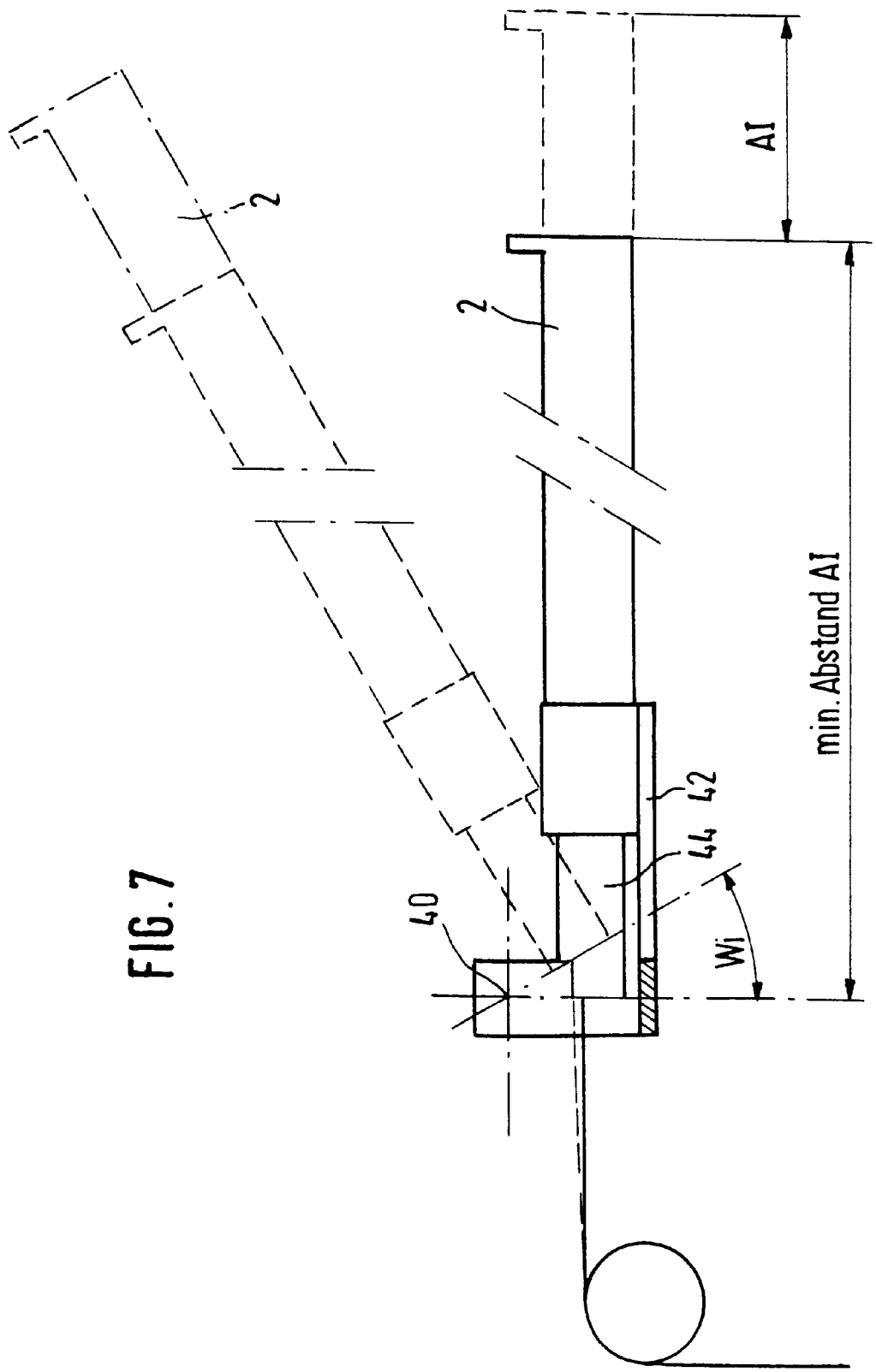
FIG. 7 is a diagramatic representation of the sensor arm and its pivotable and extendable arrangement, respectively.

FIG. 7 schematically shows the pivotable support of the sensor arm 2. A potentiometer is arranged in the pivotal point 40 which potentiometer measures the pivot angle by which the sensor arm 2 is pivoted. The sensor arm 2 is arranged in a support 42 which is pivotably supported at the point 40. The sensor arm 2 is extensibly supported on an axle 44.

It can be seen that the compensation positions at the inner compensation plane and at the outer compensation plane are mechanically stored prior to the balancing process so that these positions may be found again mechanically in order to fix the balancing weights on the wheel after the balancing process has been completed.

I claim:

1. An apparatus for compensation of an unbalance of an automotive wheel mounted on a wheel balancing apparatus, wherein at least one compensation position is stored mechanically or in a mechanical locking means for only permitting extension of a sensor arm which is extendably and pivotally disposed in a sensing means for sensing compensation positions to a respective compensation position, and two string assemblies are attached to the sensor arm, said string assemblies having mechanically lockable strings at one or another compensation position, respectively.

2. The apparatus according to claim 1, wherein one of the string assemblies comprises an extendable spring in the sensor arm and a stop running through a locking block attached to a housing of the balancing apparatus and an extendable spring at one end.

3. The apparatus according to claim 1, wherein one of the string assemblies comprises a string attached to the sensor arm which ends at an endless string loop assembly, one run of the string of the string loop assembly runs through a locking block attached to a housing of the balancing apparatus, and another run of the string loop assembly comprises a stop which is lockable via the arresting assembly.

4. The apparatus according to claim 1, wherein a locking block attached to a housing of the balancing apparatus is mechanically actuateable when the sensor arm is at a respective compensation position.

5. The apparatus according to claim 1, wherein locking blocks attached to a housing of the balancing apparatus are electromechanically actuateable.

6. The apparatus according to claim 1, wherein a potentiometer is disposed at one end of the string assemblies in order to measure a longitudinal movement of the sensor arm from a starting position of the sensor arm.

7. The apparatus according to claim 1, wherein the strings of the string assemblies are toothed belts.

8. An apparatus for compensation of an unbalance of an automotive wheel mounted on a wheel balancing apparatus, comprising:

a sensor arm;

a first string assembly and a second string assembly attached to the sensor arm;

said first string assembly comprising:
a spring and a stop arranged in the sensor arm;
a first toothed belt running around a first roller;
an extendable spring attached to a housing of the balancing apparatus; and
a first locking block positioned between the first roller and the extendable spring;

said second string assembly comprising:
a second toothed belt running across a roller, said second toothed belt being attached at a first end to the sensor arm and attached at a second end to an endless string loop assembly which extends across two rollers;
a second locking block arranged at one run of the endless string loop assembly; and
an arresting assembly provided at a second run of the endless string loop assembly, said arresting assembly cooperating with a stop connected to the endless string loop assembly.

9. A method for compensating an unbalance of an automotive wheel mounted on a wheel balance apparatus which includes a sensor arm disposable in a plurality of compensation positions, said method comprising:

determining respective compensation positions for the sensor arm;

mechanically storing the compensation positions of the sensor arm, before a balancing process, such that the compensation positions may be mechanically retrieved in order to fix balancing weights on the wheel after a balancing process has been completed.

10. The method according to claim 9, wherein said sensor arm is connected with a flexible line system, and wherein said mechanically storing comprises disposing at least one stop on said flexible line system and selectively locking said at least one stop in respective positions corresponding to respective compensation positions of the sensor arm.

11. The method according to claim 10, wherein said flexible line system comprises two string assemblies attached to the sensor arm, wherein each of said string assemblies carries a respective one of said at least one stop, and wherein said mechanically storing comprises operation of respective locks engageable with the respective stop.

12. The method according to claim 9, wherein said compensation positions correspond to respective inner and outer compensation planes of a wheel to be balanced.

13. The method according to claim 11, wherein said compensation positions correspond to respective inner and outer compensation planes of a wheel to be balanced.

* * * * *